(12) United States Patent
Yano

(10) Patent No.: US 8,162,379 B2
(45) Date of Patent: Apr. 24, 2012

(54) DOUBLE DOOR SYSTEM FOR VEHICLES

(76) Inventor: Takashi Yano, Tokyo (JP)

( * ) Notice: Subject to any disclaimer, the term of this patent is extended or adjusted under 35 U.S.C. 154(b) by 126 days.

(21) Appl. No.: 12/808,805

(22) PCT Filed: Dec. 19, 2007

(86) PCT No.: PCT/JP2007/074435
§ 371 (c)(1),
(2), (4) Date: Jun. 17, 2010

(87) PCT Pub. No.: WO2008/075721
PCT Pub. Date: Jun. 26, 2008

(65) Prior Publication Data
US 2011/0254312 A1 Oct. 20, 2011

(51) Int. Cl.
*B60J 5/04* (2006.01)
(52) U.S. Cl. .................. 296/146.4; 296/146.12; 49/502
(58) Field of Classification Search ............... 296/146.1, 296/146.4, 146.12, 146.13, 51; 49/502
See application file for complete search history.

(56) References Cited

U.S. PATENT DOCUMENTS

| | | | | |
|---|---|---|---|---|
| 6,997,504 B1 * | 2/2006 | Lang et al. | ............... | 296/146.11 |
| 7,097,229 B1 * | 8/2006 | Chernoff | ................... | 296/146.1 |
| 7,393,044 B2 * | 7/2008 | Enomoto | ..................... | 296/155 |
| 7,819,465 B2 * | 10/2010 | Elliott et al. | .................. | 296/202 |
| 7,896,425 B2 * | 3/2011 | Elliott et al. | ............. | 296/146.12 |
| 7,905,537 B2 * | 3/2011 | Sato et al. | ................ | 296/146.12 |
| 7,931,327 B2 * | 4/2011 | Ertl | ............................ | 296/146.8 |
| 2008/0231074 A1 * | 9/2008 | Suzuki et al. | ............ | 296/146.12 |
| 2010/0171336 A1 * | 7/2010 | Elliott et al. | ............. | 296/146.12 |
| 2010/0253113 A1 * | 10/2010 | Blase | ......................... | 296/146.1 |

FOREIGN PATENT DOCUMENTS

| | | |
|---|---|---|
| JP | 31-8112 | 5/1956 |
| JP | 57-95215 | 6/1982 |
| JP | 60-61365 | 4/1985 |
| JP | 61-12071 | 4/1986 |

(Continued)

OTHER PUBLICATIONS

Japanese Office Action dated Dec. 26, 2008, issued in corresponding Japanese Application No. 2007-324266 (w/English translation).

*Primary Examiner* — Jason S Morrow
(74) *Attorney, Agent, or Firm* — Clark & Brody

(57) ABSTRACT

In a four-seat coupe, it is inconvenient for a rear-seat occupant to get in/out of the vehicle while a front-seat occupant is seated. In the present invention, the length of each door of the four-seat coupe is set, so that the rear-seat occupant can get off/on the vehicle while the front-seat occupant is seated. The door is provided with detachable first opening/closing mechanisms at its front and rear end portions. The first opening/closing mechanism at the front end portion of the door is adapted to be released when the front-seat occupant gets off/on the vehicle to allow the first opening/closing mechanism at the rear end portion of the door to support the door so that opening/closing motion can be performed. Also, the first opening/closing mechanism at the rear end portion of the door is adapted to be released when the rear-seat occupant gets off/on the vehicle to allow the first opening/closing mechanism at the front end portion of the door to support the door so that opening/closing motion can be performed.

4 Claims, 11 Drawing Sheets

FOREIGN PATENT DOCUMENTS

| | | |
|---|---|---|
| JP | 61-58629 | 12/1986 |
| JP | 63-284343 | 11/1988 |
| JP | 2-283525 | 11/1990 |
| JP | 5-85176 | 4/1993 |
| JP | 11-301273 | 11/1999 |
| JP | 2004-100309 | 4/2004 |
| WO | 2005/111352 A1 | 11/2005 |

* cited by examiner (a)

1  2  11  10                    12  11  3

(b)

1  2  11                    10  12  11  3

(c)

1  2  11                    10  12  11  3

(a)

(b)

(c)

(a)

(b)

(c)

(d)

(a)

401
411
413
412  414  415  74    423  421  442  422

(b)

411  414  415  401  421  424  425 415  414  411

(c)

414
415
414
411
401  423  422  421  441  442  411

(d)

443

(a)

(b)

(a)

714  711  712  713
71

(b)

725  724  721  722  723
72

(c)

735  734  731  732  733
73

(d)

425
424
422
421
74
423

(a)

(b)

(c)

(d)

DOUBLE DOOR SYSTEM FOR VEHICLES

TECHNICAL FIELD

The present invention relates to vehicle doors.

BACKGROUND ART

The present invention relates to a technique associated with a door mode for four-seat coupes. With this door arrangement, the rear-seat occupant can readily get off/on the vehicle while the front-seat occupant is seated. Two conventional techniques will be explained. The first technique relates to long double-hinge doors. The Renault Avantime (France; production stopped in 2004) can be taken as an example of the vehicle using this door mode. The second technique relates to long gull-wing doors. The Renault Nepta (France; released in 2006) can be taken as an example of the vehicle using this door mode. This vehicle has roofless-type long gull-wing doors.

However, in the case of the long double-hinge doors as well, the doors are required to have a good length in order that the rear-seat occupant can get off/on the vehicle while the front-seat occupant is seated. In generally used parking areas, such long doors tend to cause difficulty when the doors are opened/closed (the space between adjacent double-parked car is insufficient even for a double-hinge door). In the case of the long gull-wing doors, the solid mechanism of vertically opening/closing the heavy large doors problematically increases the weight of the vehicle. Also, such doors are imposed with limitation by the systems of parking areas (insufficient height of mechanical parking systems).

Double doors for vehicles disclosed in patent documents will be explained. The doors disclosed in Patent Documents 1 and 2 are aimed to be opened/closed in narrow and crowded places and not aimed for the rear-seat occupant to get off/on the vehicle while the front-seat occupant is seated. The illustrations indicate the normal (not long) doors of a normal two-door sedan. Patent Document 2 also essentially gives the same description.

Patent Document 3 describes an aim of resolving the issue that no measures could have been taken against the occurrence of necessity of opening each door from the opposite side. Further, FIG. 4 illustrates the doors of a truck having no rear seats. None of these three patent documents discloses a technique with which the rear-seat occupant can get in/out of the vehicle while the front-seat occupant is seated.

Patent Document 1: Japanese Patent Publication No. 61-12071
Patent Document 2: Japanese Patent Publication No. 61-58629
Patent Document 3: Japanese Patent Application Laid-Open Publication No. 63-284383

DISCLOSURE OF THE INVENTION

Problems to be Solved by the Invention

Four-seat coupes with front-hinge doors have suffered from a problem of inconveniency caused when the rear-seat occupant gets off/on the vehicle while the front-seat occupant is seated. In the case of long front-hinge doors, the doors have had to be widely opened in order that the front-seat occupant can get off/on the vehicle.

Means for Solving the Problems

In order to solve the problem, the present invention uses long double doors. Use of such long double doors may allow the rear-seat occupants to get off/on the vehicle with rear-side opening/closing motion while the front-seat occupants are seated. Use of the long double doors may also allow the front-seat occupants to get off/on the vehicle with a small amount of front-side opening/closing motion.

Use of the long double doors may raise problems of insufficient rigidity of the doors, which is revealed in opening/closing the doors and ascribed to the large length of the doors, and of insufficient rigidity of the vehicle body, which is revealed during the traveling of the vehicle and ascribed to the large openings for the doors. As countermeasures against these problems, the long double doors, firstly, are each provided with a second opening/closing means at the center portion thereof so as to ensure support by a first opening/closing means provided at the front- or rear-end portion of the door and by the second opening/closing means. Secondly, the second opening/closing means at the center portion of each door is constituted of a folding link mechanism, and a link portion on the side of the vehicle body is configured to be positioned near the door plane in the state where the door is closed.

Effects of the Invention

Use of the long double doors may allow the rear-seat occupants to get off/on the vehicle while the front-seat occupants are seated. Also, use of the long double doors may allow the front-seat occupants to get off/on the vehicle with a small opening angle of the doors. Further, use of the long double doors may promise new designs for four-seat coupes. In addition, each of the long double doors has a length equal to the total length of the front and rear doors of a four-door vehicle, with the absence of a so-called B pillar that would otherwise be present between the front and rear doors, and with the integration of the window glass. Thus, an open boarding space can be ensured by the use of such long double doors.

The long double doors, each being provided with the second opening/closing means at the center thereof, can exert high rigidity against the stress that would be caused by persons in opening/closing the doors or by wind pressure. Also, the long double doors, each being provided with the second opening/closing means constituted of a folding link mechanism, can ensure strong link between the doors and the vehicle body at the center lower end of each of the doors. Accordingly, the vehicle body and each of the long double doors are strongly linked by the first opening/closing means provided at the front and rear ends and the second opening/closing means provided at the center, and can integrally exert high rigidity.

BRIEF DESCRIPTION OF THE DRAWINGS

FIG. 9 illustrates by (a) the motion restriction mechanism (first embodiment), by (b) the automatic drive mechanism (second embodiment), by (c) the power-assistance drive mechanism (third embodiment), and by (d) the folding link mechanism (fourth embodiment);

DESCRIPTION OF SYMBOLS

Figure 1:
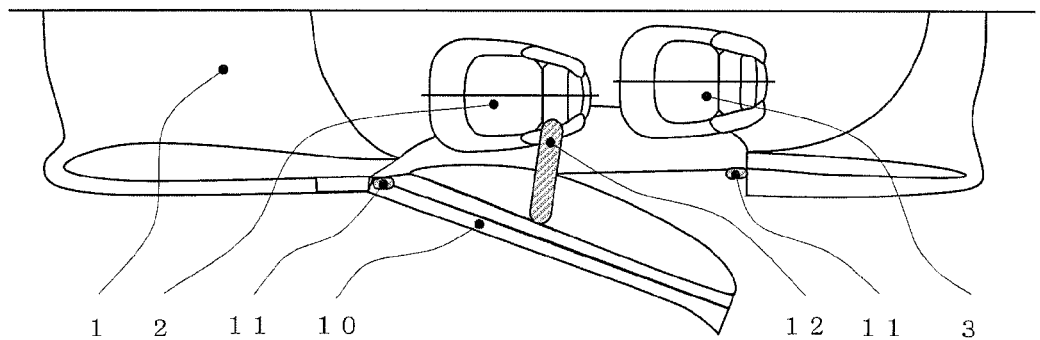
FIG. 1 illustrates appearance diagrams of a four-seat coupe installing a door system (hinge mechanism and link mechanism) (first and second embodiments)
Figure 1:
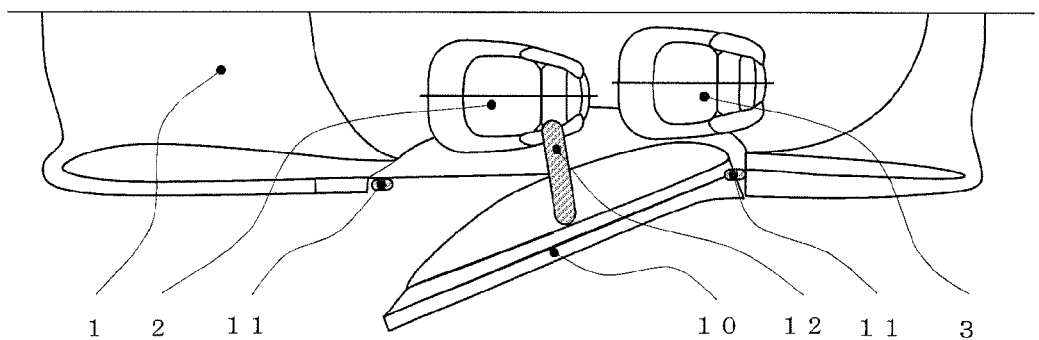
Figure 1:
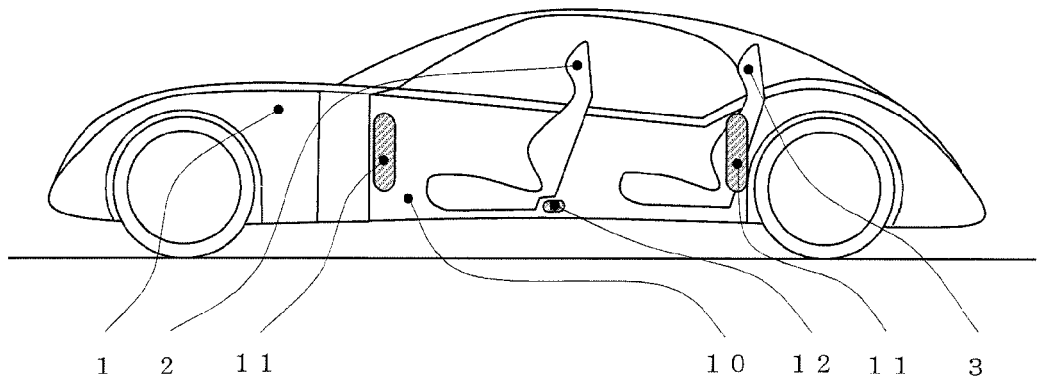

1 Vehicle body
2 Front seat
3 Rear seat
5 Retractable door handle
6 Remote control means
10 Long double door
11 Detachable first opening/closing means
12 Second opening/closing means
40 Long double door (double-hinge mechanism, folding link mechanism)
41 Detachable first opening/closing means (double-hinge mechanism, folding link mechanism)
42 Second opening/closing means (double-hinge mechanism, folding link mechanism)
44 Door fastening means
51 Door handle switch
52 Door force angle sensor
52a Opening button
52b Closing button
61 Door switch
61a Opening button
61b Closing button
62 Safety switch
71 Motion restriction mechanism
72 Automatic drive mechanism
73 Power-assistance drive mechanism
74 Rotary actuator (automatic drive mechanism)
101 Door-side bracket
111 Vehicle body-side bracket 111
112 Pin
113 Solenoid
121 Link
131 Door position sensor
132 Operation unit
133 Control unit
134 Door lock solenoid
401 Door-side bracket (double-hinge mechanism, folding link mechanism)
411 Vehicle body-side bracket (double-hinge mechanism, folding link mechanism)
412 Pin (double-hinge mechanism, folding link mechanism)
413 Door lock solenoid (double-hinge mechanism, folding link mechanism)
414 Double-hinge link (double-hinge mechanism, folding link mechanism)
415 Hinge actuator (double-hinge mechanism, folding link mechanism)
421 First link-attaching bracket (double-hinge mechanism, folding link mechanism)
422 First link-attaching pin (double-hinge mechanism, folding link mechanism)
423 First link (double-hinge mechanism, folding link mechanism)
424 Second link (double-hinge mechanism, folding link mechanism)
425 Second link-attaching pin (double-hinge mechanism, folding link mechanism)
431 Door position sensor (double-hinge mechanism, folding link mechanism)
432 Operation unit (double-hinge mechanism, folding link mechanism)
433 Control unit (double-hinge mechanism, folding link mechanism)
441 Fastening pin (double-hinge mechanism, folding link mechanism)
442 Fastening bracket (double-hinge mechanism, folding link mechanism)
443 Truss structure for linking vehicle body and door
711 Case
712 Shaft
713 Stopper
714 Friction brake
721 Case (automatic drive mechanism)
722 Shaft (automatic drive mechanism)
723 Stopper (automatic drive mechanism)
724 Friction brake (automatic drive mechanism)
725 Linear motor (automatic drive mechanism)
731 Case (power-assistance drive mechanism)
732 Shaft (power-assistance drive mechanism)
733 Stopper (power-assistance drive mechanism)
734 Friction brake (power-assistance drive mechanism)
735 Linear motor (power-assistance drive mechanism)

BEST MODE FOR IMPLEMENTING THE INVENTION

Long double door system for four-seat coupes. The length of a long double door corresponds to the total length of the front and rear doors of a four-door vehicle. In the case of the long double door, the rear-seat occupant gets off/on the vehicle while the front-seat occupant is seated, with the rear-side opening/closing motion of the door. Also, the front-seat occupant gets off/on the vehicle with the front-side opening/closing motion of the long double door.

First Embodiment

A first embodiment is a long double door system corresponding to claims 1 and 2. The long double door system includes hinged detachable first opening/closing means 11 and second opening/closing means 12 having a motion restriction mechanism 71. FIG. 1 illustrates appearance diagrams of a four-seat coupe installing the long double door system of the first embodiment. FIG. 1 illustrates by (a) a plan view of the vehicle at the time of performing rear-side opening/closing, by (b) a plan view of the vehicle at the time of performing front-side opening/closing and by (c) is a front view. FIG. 1 perspectively illustrates a long double door 10, the detachable first opening/closing means 11 each configured to have a hinge mechanism, the second opening/closing means 12, a front seat 2 and a rear seat 3. The second opening/closing means 12 is positioned at a lower rear part of the front seat 2, so that the comfort of the front- and rear-seat occupants will not be deteriorated and that the occupants will not be prevented from getting off/on the vehicle.

Figure 2:
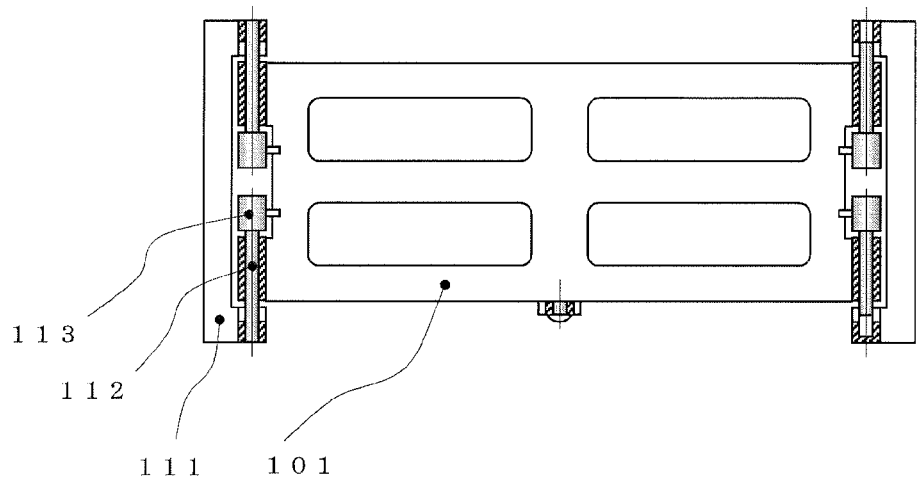
FIG. 2 illustrates structure diagrams of a door system (hinge mechanism and link mechanism) (first, second and third embodiments)
Figure 2:
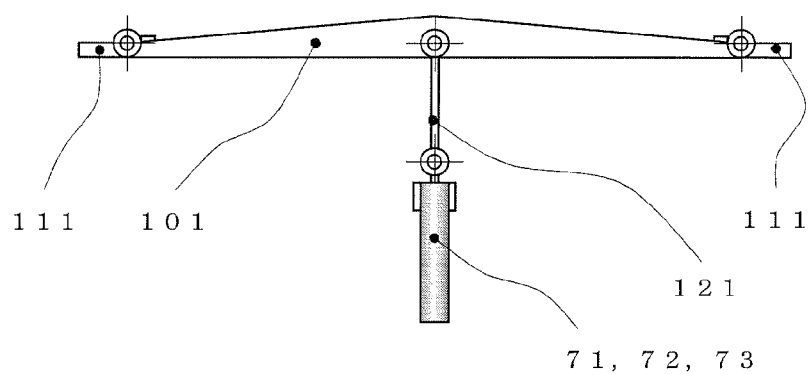
Figure 2:
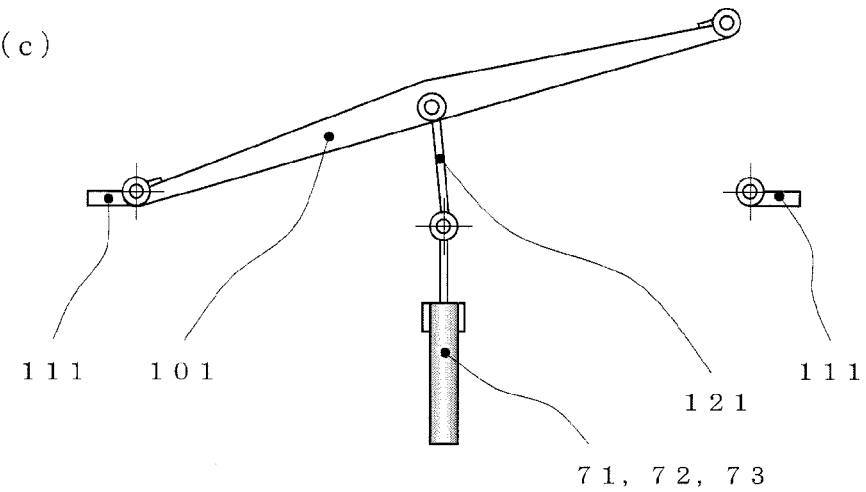
Figure 4:
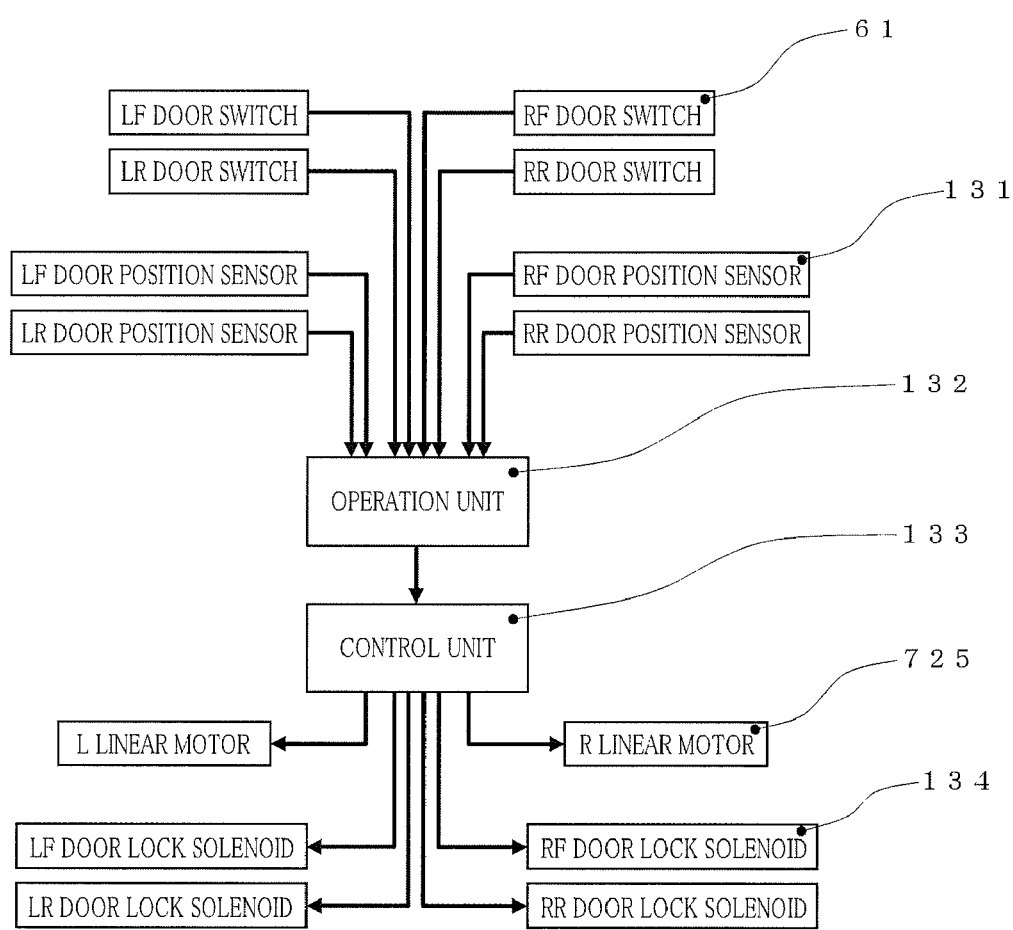
FIG. 4 illustrates a schematic diagram of a control system of a door system (hinge mechanism, link mechanism and automatic drive mechanism) (second embodiment)

FIG. 2 illustrates structure diagrams of the detachable first opening/closing means 11 and the second opening/closing means 12. FIG. 4 illustrates by (a) a front view of the means as viewed from outside the long double door 10, by (b) a plan view of the means as viewed from below the long double door 10 in a closed state, and by (c) is a plan view of the means as viewed from below the long double door 10 in an opened state. The first opening/closing means 11 each includes a solenoid 113, an operating pin 112 and a vehicle body-side bracket 11. The second opening/closing means 12 includes the vehicle body-side bracket 111, a link 121 and the motion restriction mechanism 71. A door-side bracket 101 is assembled into the long double door 10 and the vehicle body-side bracket 111 is assembled into a vehicle body 1.

Firstly, the solenoid 113 of the detachable first opening/closing means 11 takes the pin 112 out of the vehicle body-side bracket 111 to enable opening/closing of the door-side bracket 101. The solenoids 113 at the front end portion and the rear end portion of the door-side bracket 101 cannot be simultaneously operated but only one of them can be operated at a time. Accordingly, the long double door 10 will not drop. Secondly, the door opened by the operator is supported at an optional opening/closing position by the motion restriction mechanism 71 and the link 121 of the second opening/closing means 12, with the amount of opening/closing of the door being restricted. The second opening/closing means 12 prevents the long double door 10 from being broken by wind pressure and prevents the occupants from being hurt when the door is abruptly closed.

Figure 9:
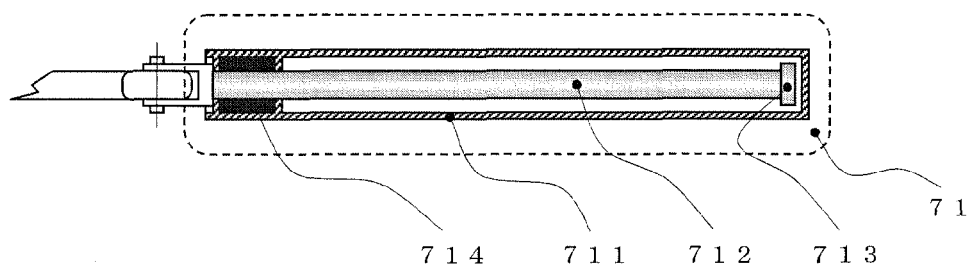
FIG. 9 specifically illustrates second opening/closing means, i.e.
Figure 9:
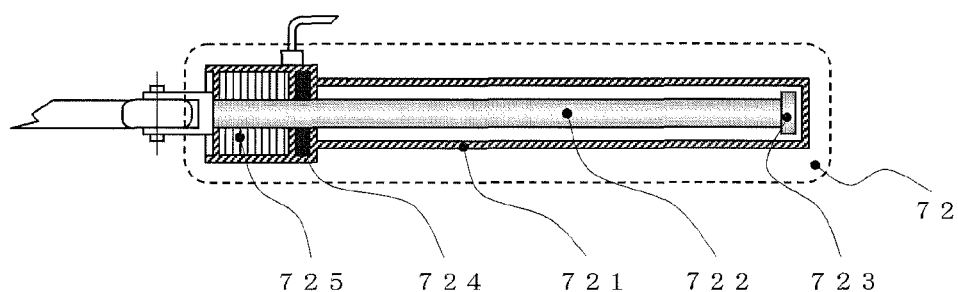
Figure 9:
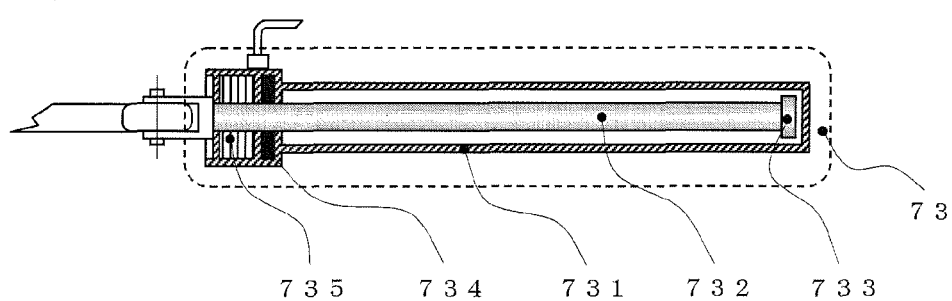
Figure 9:
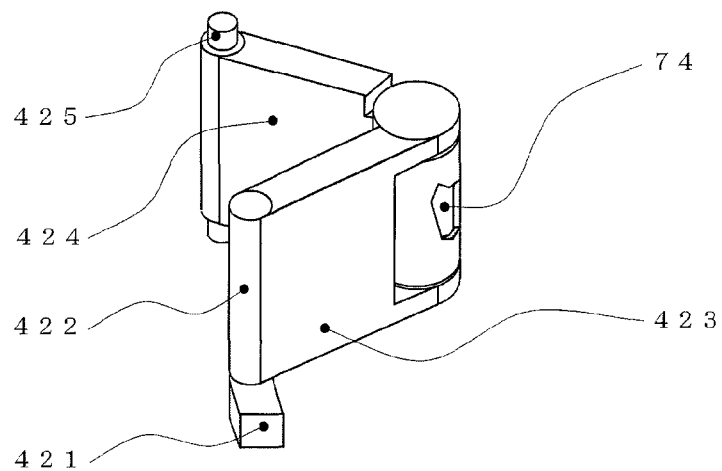

FIG. 9 illustrates by (a) a cross-sectional view of the motion restriction mechanism 71. A friction brake 714 has a function of supporting the door at an optional opening/closing position and restricting the opening/closing speed of the door. A stopper 713 has a function of restricting the amount of opening/closing.

Figure 10:
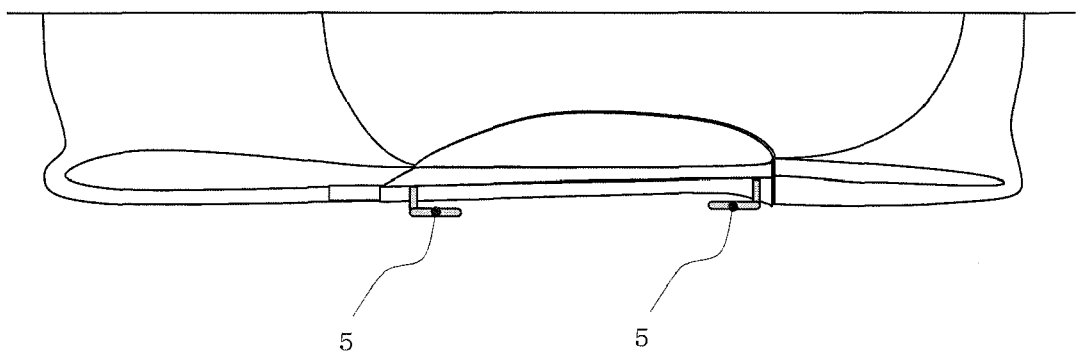
FIG. 10 illustrates retractable door handles and appearance diagrams of a vehicle mounting the retractable door handles (first and third embodiments)
Figure 10:
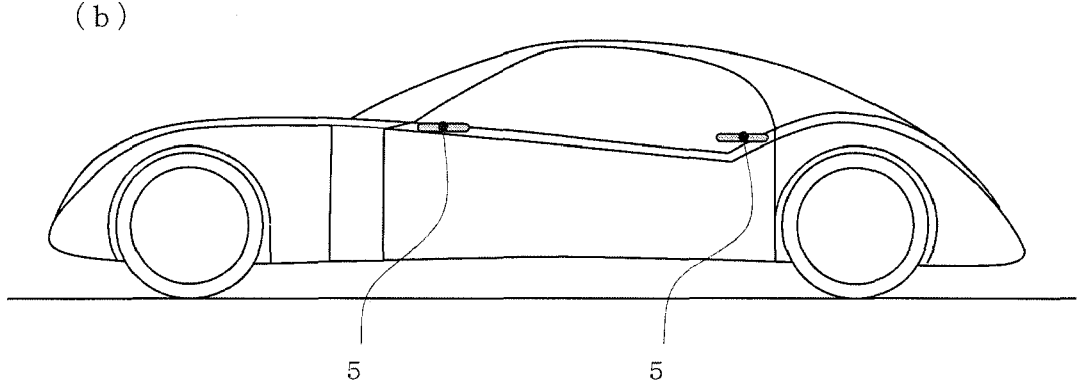
Figure 10:
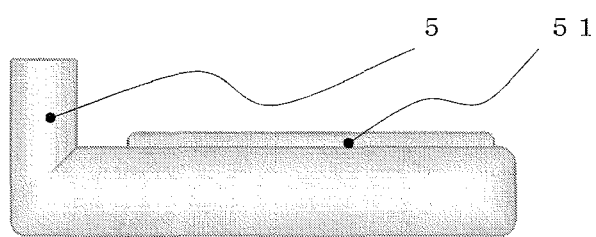
Figure 10:
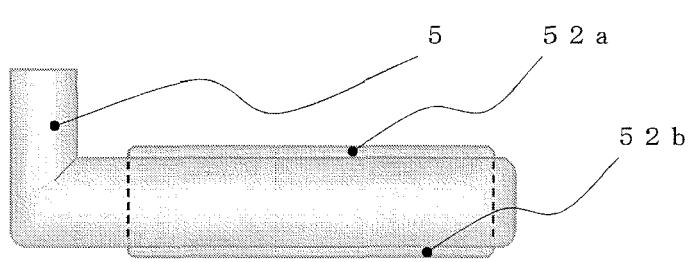

FIG. 10 illustrates retractable door handles 5 and appearance diagrams of a vehicle mounting the retractable door handles. FIG. 10 illustrates by (a) a plan view of the vehicle, by (b) a front view of the vehicle and by (c) a plan view of the door handle 5 mounting a door handle switch 51. The door handle switch 51 senses the stress caused when the operator has attempted to open the door.

Figure 3:
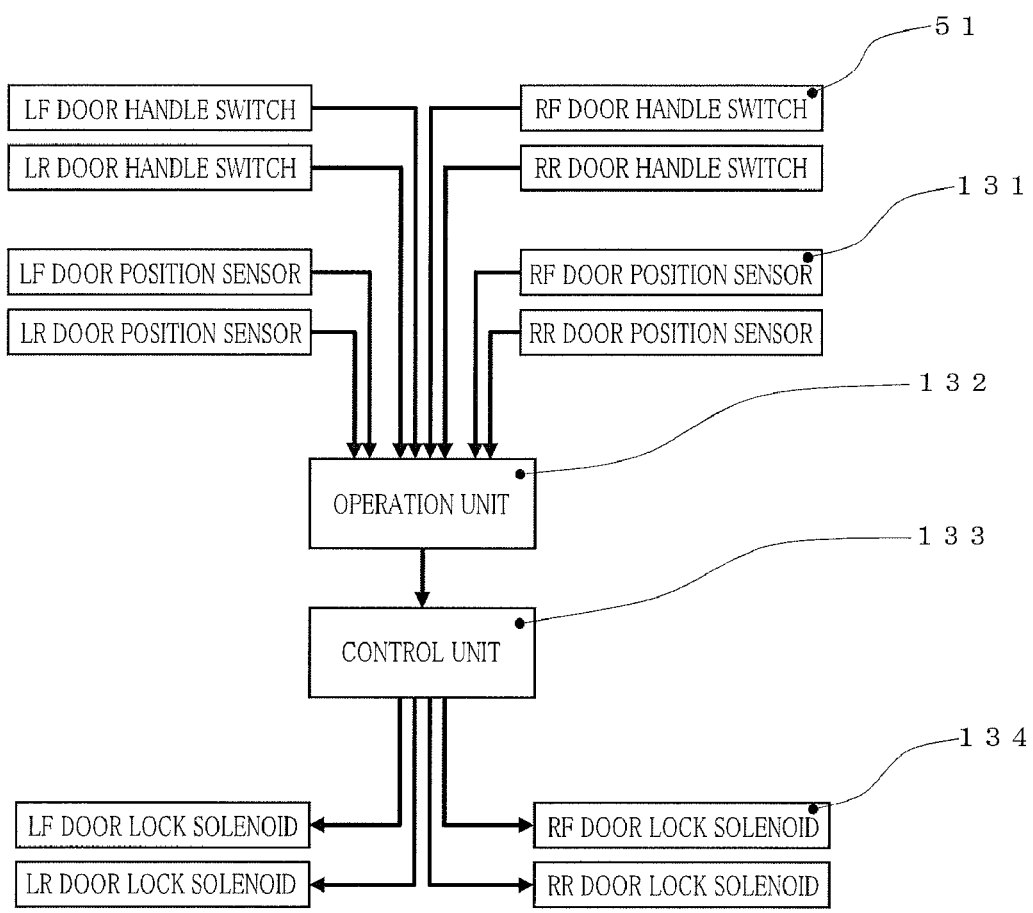
FIG. 3 illustrates a schematic diagram of a control system of a door system (hinge mechanism, link mechanism and motion restriction mechanism) (first embodiment)

FIG. 3 illustrates a schematic diagram of a control system of the first embodiment. Upon pressing of any of the right-front, left-front, right-rear or left-rear door handle switch 51 by the operator, the signal is processed in an operation unit 132 and transmitted to a control unit 133. The control unit 133 controls a corresponding door lock solenoid 134 to enable opening/closing of the long double door 10. When the right-front and right-rear, or the left-front and left-rear door handle switches 51 are simultaneously pressed, the operation unit 132 selects one door handle switch 51 which is supposed to have been pressed the earliest. When the long double door 10 is closed by the operator, it is sensed by all of right-front, left-front, right-rear and left-rear door position sensors 131. Then, the control unit 133 controls the door lock solenoids 134 to lock the long double doors 10.

Second Embodiment

A second embodiment is a long double door system corresponding to claims 1, 2 and 3. The long double door system includes hinged detachable first opening/closing means 11 and second opening/closing means 12 having an automatic drive mechanism 72. The automatic drive mechanism 72 is a mode of a power drive mechanism in which opening/closing is automatically performed with the operation of a switch. The appearance diagrams of a four-seat coupe installing the long double door system of the second embodiment are common to those of the first embodiment illustrated in FIG. 1.

Referring to the structure diagrams of FIG. 2, the motion restriction mechanism 71 of the first embodiment can be replaced, in the second embodiment, by the automatic drive mechanism 72.

FIG. 9 illustrates by (b) a cross-sectional view of the automatic drive mechanism 72. A linear motor 725 drives a shaft 722.

Figure 11:
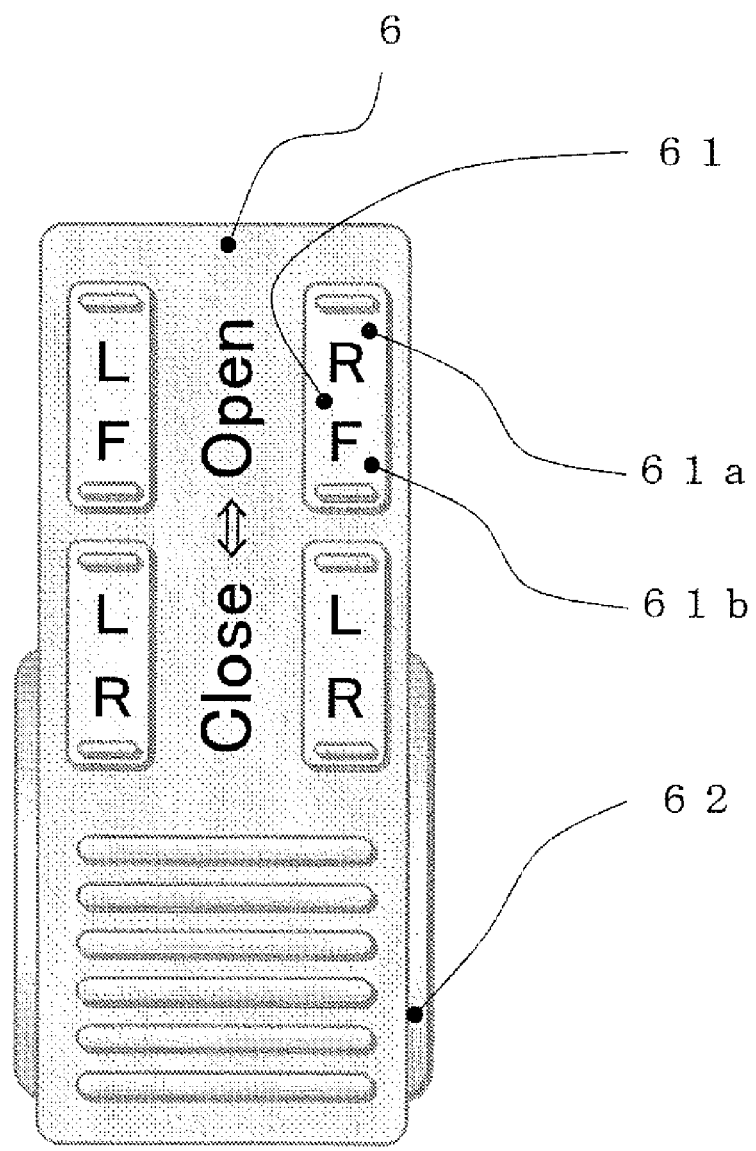
FIG. 11 illustrates an appearance diagram of a remote control means (second and fourth embodiments).

FIG. 11 illustrates an appearance diagram of remote control means 6. Door switches 61 are seesaw switches each consisting of an opening button 61a and a closing button 61b. The remote control means 6 has a grip where a safety switch 62 is mounted. When the remote control means is not correctly held by the operator, the safety switch 62 invalidates the signal from the door switches.

FIG. 4 illustrates a schematic diagram of a control system of the automatic drive mechanism 72. When the operator has pressed the opening button 61a of any of the right-front, left-front, right-rear or left-rear door switch 61 mounted on the vehicle console or the remote control means, the signal is processed in an operation unit 132 and transmitted to a control unit 133. Then, the control unit 133 controls a corresponding door lock solenoid 134 and drives the linear motor 725 of the automatic drive mechanism 72 to thereby open the long double door 10 up to a predetermined position. When a plurality of the door switches 61a are pressed simultaneously, the operation unit 132 selects one door switch 61 which is supposed to have been pressed the earliest. Upon pressing of the closing button 61b of the door switch 61 by the operator, the signal is processed in the operation unit 132 and transmitted to the control unit 133. Then, the control unit 133 drives the linear motor 725 of the corresponding automatic drive mechanism 72 to move the long double door 10 to a closing position. This is sensed by all of right-front, left-front, right-rear and left-rear door position sensors 131, and then the control unit 133 controls door lock solenoids 134 to lock the long double doors 10.

Third Embodiment

A third embodiment is also a long double door system corresponding to claims 1, 2 and 3. The automatic drive mechanism 72 of the second embodiment has been replaced by a power-assistance drive mechanism 73. The power-assistance drive mechanism 73 is also a mode of power drive mechanism which senses force imposed on the door handle to give assistance to the operator so that the door can be opened/closed with a small force by the operator. The appearance diagrams of a four-seat coupe installing the long double door system of the second embodiment are common to those of the first and second embodiments illustrated in FIG. 1.

Referring to the structure diagrams of FIG. 2, the automatic drive mechanism 72 of the second embodiment can be replaced, in the third embodiment, by the power-assistance drive mechanism 73.

FIG. 9 illustrates by (c) a cross-sectional view of the power-assistance drive mechanism 73. A linear motor 735 drives a shaft 732. Compared to the linear motor 725 of the second embodiment, the linear motor 735 in use has a small drive force but is suitable for variable speed control.

FIG. 10 illustrates by (d) an appearance diagram of a retractable door handle 5 mounting a door handle force-angle sensor 52. The force-angle sensor 52 has two pressure receiving portions, i.e. an opening button 52a and an opening button 52b, and senses stress and its direction.

Figure 5:
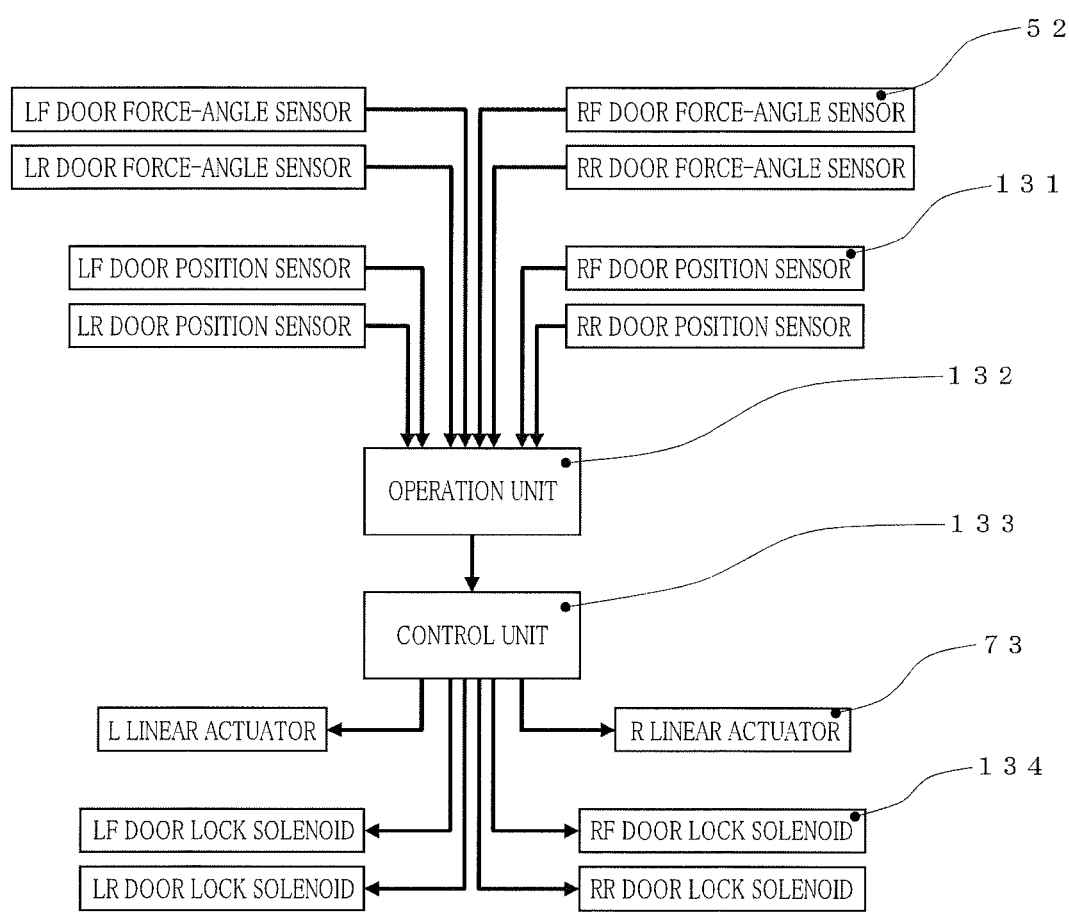
FIG. 5 illustrates a schematic diagram of a control system of a door system (hinge mechanism, link mechanism and power-assistance drive mechanism) (third embodiment)

FIG. 5 is illustrates schematic diagram of a control system of the power-assistance drive mechanism 73. When the right-front, left-front, right-rear or left-rear door force-angle sensor 52 is pressed in the opening direction by the operator, the signal is processed in an operation unit 132 and transmitted to a control unit 133. Then, the control unit 133 controls a corresponding door lock solenoid 134 and drives the linear motor 735 of a corresponding linear actuator 73 with a force or speed suitable for the pressing force against the door force-angle sensor 52 to thereby open the long double door 10 up to a predetermined position. When a plurality of door force-angle sensors 52 are pressed simultaneously, the operation unit 132 selects one door force-angle sensor 52 which is supposed to have been pressed the earliest. When the door force-angle sensor 52 is pressed in the closing direction by the operator, the signal is processed in the operation unit 132 and transmitted to the control unit 133. Then, the control unit 133 drives the linear motor 735 of a corresponding linear actuator 73 with a force or speed suitable for the pressure against the door force-angle sensor 52 to thereby move the long double door 10 to a closing position. This is sensed by all of right-front, left-front, right-rear and left-rear door position sensors 131, and the control unit 133 controls door lock solenoids 134 to lock the long double doors 10.

Fourth Embodiment

Figure 6:
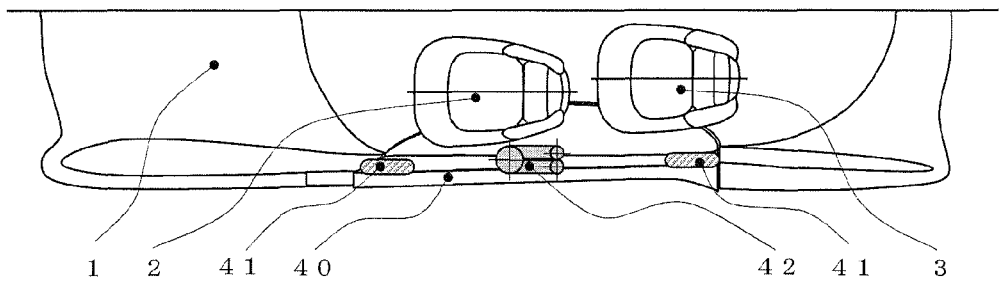
FIG. 6 illustrates appearance diagrams of a four-seat coupe installing a door system (double-hinge mechanism and folding link mechanism) (fourth embodiment)
Figure 6:
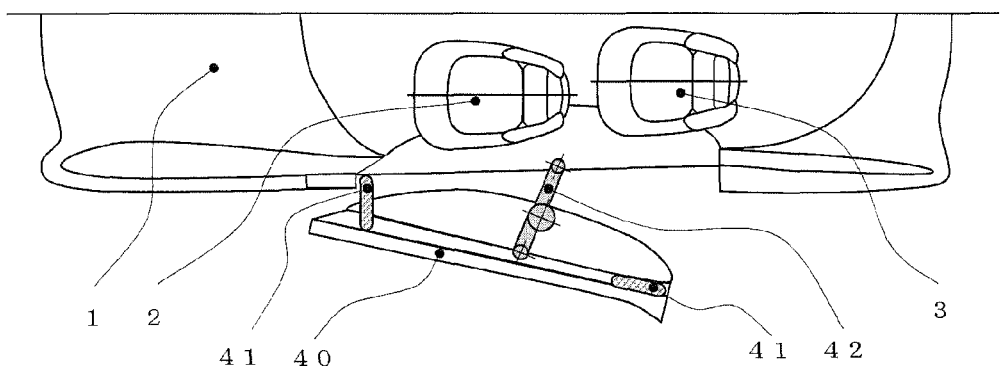
Figure 6:
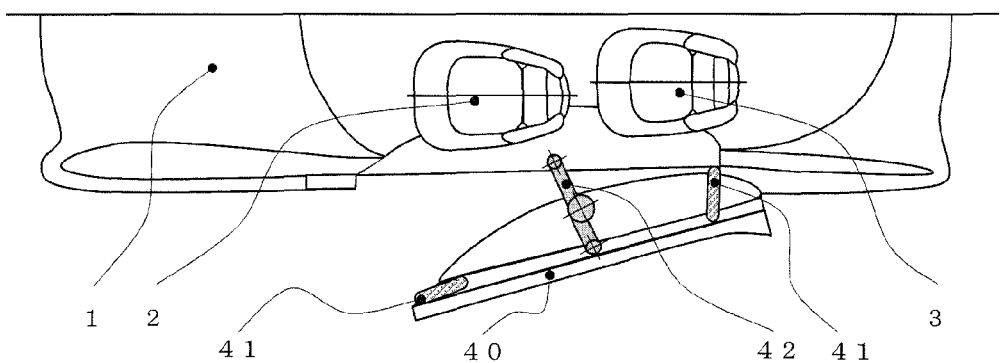
Figure 6:
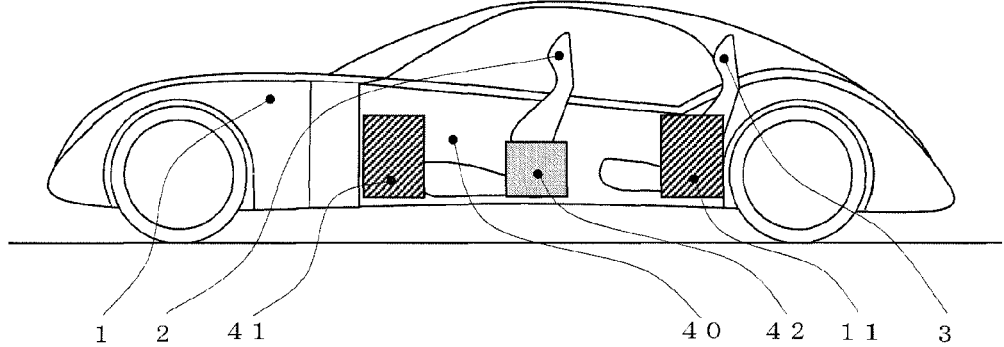

A fourth embodiment is a long double door system corresponding to claims 1, 2, 3 and 4. The long double door system includes a detachable double-hinge first opening/closing means 41 and a second opening/closing means 42 having a folding link mechanism. FIG. 6 illustrates appearance diagrams of a four-seat coupe installing the long double door system of the fourth embodiment. FIG. 6 illustrates by (a) a plan view of the vehicle in the state where the door is closed, by (b) a plan view of the vehicle at the time of performing rear-side opening/closing, by (c) is a plan view of the vehicle at the time of performing front-side opening/closing and by (d) is a front view of the vehicle. The second opening/closing means 42 consisting of a folding link mechanism is a pantograph mechanism consisting of two links. The pantograph mechanism is adapted to open/close the door by changing the relative angle between the two links. The second opening/closing means 42 consisting of a folding link mechanism is accommodated in a recessed portion of the door in the state where the door is closed, so that the comfortability will not be deteriorated.

Figure 7:
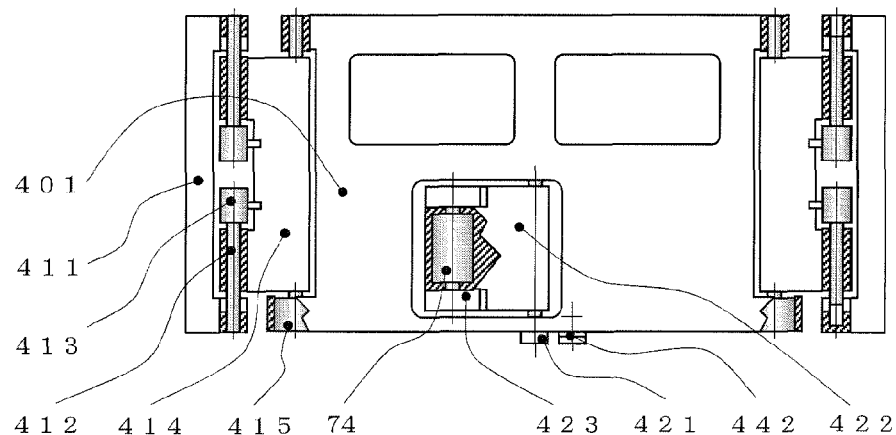
FIG. 7 illustrates structure diagrams of a door system (double-hinge mechanism and folding link mechanism) (fourth embodiment)
Figure 7:
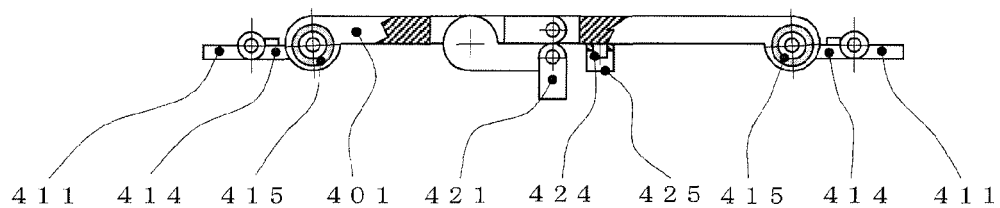
Figure 7:
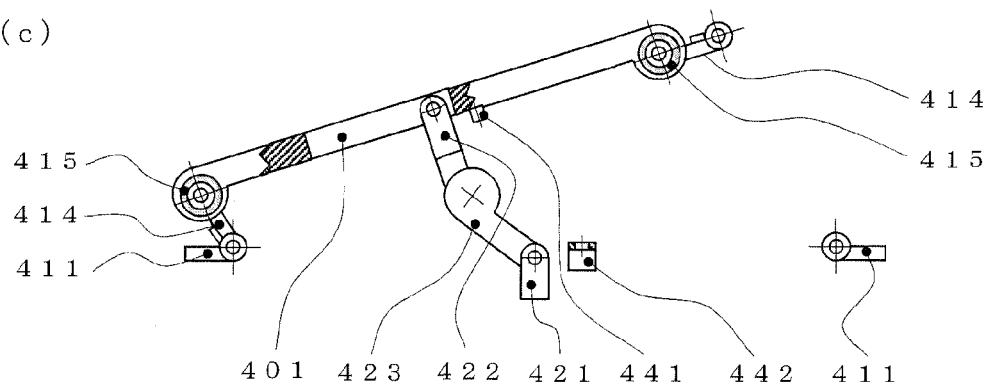
Figure 7:
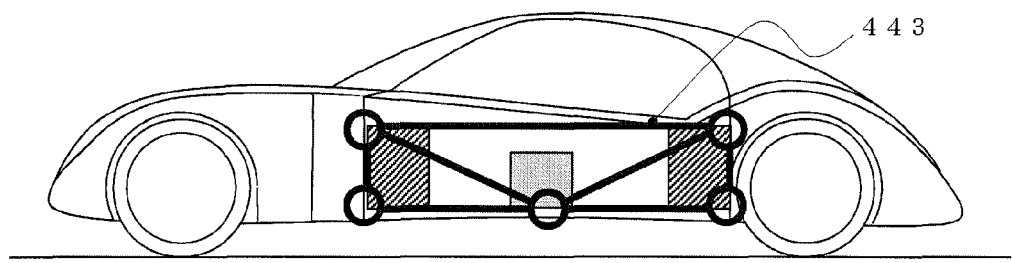

FIG. 7 illustrates structure diagrams of the double-hinge detachable first opening/closing means 41 and the second opening/closing means 42 consisting of a folding link mechanism. FIG. 7 illustrates by (a) a front view of the means as viewed from outside a long double door 40, by (b) a plan view of the means as viewed from below the long double door 40 in a closed state and by (c) is a plan view of the means as viewed from below the long double door 40 in an opened state. A door-side bracket 401 is connected to the long double door 40. A vehicle body-side bracket 411 is connected to a vehicle body 1. A link-attaching bracket 421 is connected to the vehicle body. Also, the detachable double-hinge first opening/closing means 41 consists of a double-hinge link 414 and a hinge actuator 415. The second opening/closing means 42 consisting of a folding link mechanism consists of a first link 423, a second link 424 and a rotary actuator 74 located at a hinge portion of the second link 424.

Firstly, a solenoid 413 of the detachable double-hinge first opening/closing means 41 at a front- or rear-end portion of the door-side bracket 401 takes a pin 412 out of the vehicle body-side bracket 211 to enable opening/closing of the door-side bracket 401. Secondly, the rotary actuator 74 of the second opening/closing means 42 consisting of a folding link mechanism allows the first link 423 and the second link 424 to rotate and expand. Accompanying this, the hinge actuator 415 of the detachable double-hinge first opening/closing means 41 allows the double-hinge link 414 to rotate. With these two interlocked motions, the second and first opening/closing means 42 and 41 open the door on the rear side while allowing the door-side bracket 201 to move forward with respect to the vehicle body, or open the door on the front side while allowing the door-side bracket 201 to move rearward with respect to the vehicle body.

FIG. 9 illustrates by (d) the details of the second opening/closing means 42 consisting of a folding link mechanism. The rotary actuator 74 has a rotary shaft secured to the first link 423 and has a body secured to the second link 424. The other end portion of the first link 423 is connected to the vehicle body 1 via a first link-attaching pin 422 and a first link-attaching bracket 421. The other end portion of the second link 424 is connected to the door 40 via a second link-attaching pin 425 and the door-side bracket 401.

Figure 8:
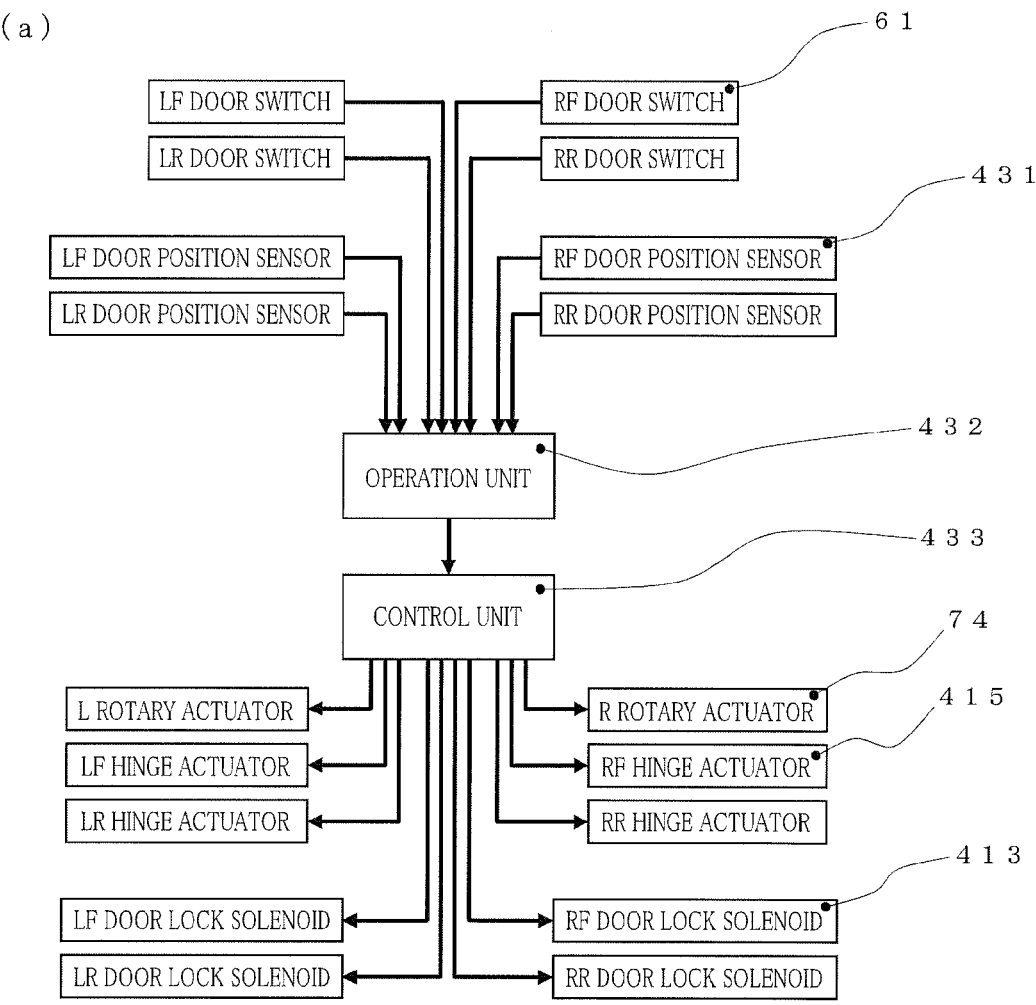
FIG. 8 illustrates by (a) a schematic diagram of a control system of a door system (double-hinge mechanism, folding link mechanism and automatic drive mechanism), and by (b) a characteristics diagram of a function 432A (fourth embodiment)
Figure 8:
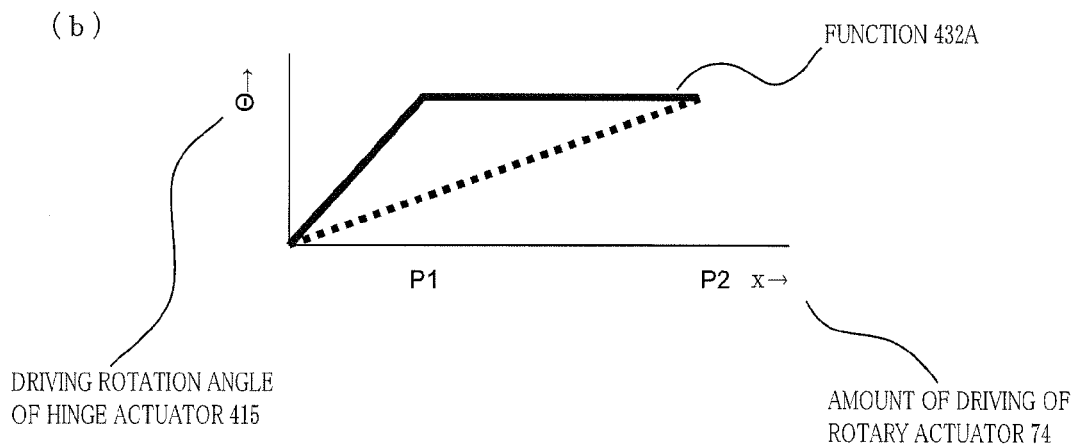

FIG. 8 illustrates by (a) a schematic diagram of a control system of an automatic door mechanism (power drive mechanism). When the operator presses an opening button 61a of a right-front, left-front, right-rear or left-rear door switch 61 mounted on the vehicle console or on the remote control means, the signal is processed with a function 432B in an operation unit 432 and transmitted to a control unit 433. Then, the control unit 433 controls a corresponding door lock solenoid 413 and drives a corresponding rotary actuator 74 and a corresponding hinge actuator 415 to open the long double door 40 up to a predetermined position. When a plurality of door switches 61 are pressed simultaneously, the operation unit 432 selects one door switch 61 which is supposed to have been pressed the earliest. When the closing button 61b of the door switch 61 is pressed by the operator, the signal is processed in the operation unit 432 and transmitted to the control unit 433. Then, the control unit 433 drives the corresponding rotary actuator 74 and the hinge actuator 415 to move the long double door 40 to a closing position. This is sensed by all of the right-front, left-front, right-rear and left-rear door position sensors 431, and the control unit 433 controls the door lock solenoids 413 to lock the long double doors 40.

FIG. 8 illustrates by (b) a characteristics diagram of the function 432A. The x-axis indicates the amount of driving of the rotary actuator 74 and the θ-axis indicates the driving rotation angle of the hinge actuator 415. With respect to the line connecting a mass start point and an end point (dash line in the figure), the hinge actuator 415, when $P1 > x \geq 9$ constitutes, performs the operations of the full processes and when $P2 \geq x \geq P1$ constitutes, performs no operation.

Modifications of the fourth embodiment will be described. The second opening/closing means 42 consisting of a folding link mechanism may be replaced by a pantograph mechanism consisting of four links. Also, the detachable double-hinge first opening/closing means 41 may be replaced by such a mode as the simple hinge mechanism of the first embodiment or a slide mechanism. Further, the automatic door mechanism (power drive mechanism) may be replaced by the motion restriction mechanism of the first embodiment or the power-assistance drive mechanism of the third embodiment.

With reference to (d) of FIG. 7 and (d) of FIG. 9, the rigidity of the vehicle body of the fourth embodiment will be described. In order to enhance the road-holding performance of a vehicle in high-speed cornering, the torsional rigidity of the vehicle body must be enhanced so that correct operation of the suspension can be ensured. Since the vehicle body having long doors such as of the present invention will have large door openings, it is not easy to enhance the torsional rigidity of the vehicle body.

In the fourth embodiment, the vehicle body 1 is adapted to have an integrated structure including the long double doors 40. The double-hinge link 414 of the first opening/closing means 41 becomes parallel to the door plane in the vicinity thereof, in the state where the door is closed. The first and second links 423 and 424 of the second opening/closing means 42 are folded so as to be parallel to the door plane in the vicinity thereof, in the state where the door is closed. The first and second link-attaching pins 422 and 425 are both located in the vicinity of the door plane, and the first link-attaching bracket 421 is also located in the vicinity of the door plane. In this way, the detachable double-hinge first opening/closing means 41 and the second opening/closing means consisting of a folding link mechanism are unlikely to be applied with the moment caused by the torsional stress imposed on the vehicle body 1. Accordingly, as illustrated by (d) in FIG. 7, the vehicle body 1 and the long double door 40 will be connected with high rigidity via the detachable double-hinge first opening/closing means 41 at the front and rear ends of the long double door 40 and the second opening/closing means 42 consisting of a folding link mechanism at the center lower end thereof. As indicated by the thick lines, a truss structure 443 will be formed connecting the vehicle body and the door.

With reference to (d) of FIG. 7, a system for further enhancing the rigidity of the vehicle body in the fourth embodiment will be described. A fastening pin 441 is provided at the center lower end of the door-side bracket 401. Also, a fastening bracket 442 that mates with it is provided at the vehicle body 1. The fastening pin 441 is fastened to the fastening bracket 442 in the state where the door is closed. The fastening bracket 442 is also located in the vicinity of the door plane to reinforce the connection established at the center lower end of the door between the long double door 40 and the vehicle body 1.

INDUSTRIAL AVAILABILITY

The long double door of the present invention may be very effectively used in four-seat cabriolets and promises new design. Due to the necessity of supporting the door when opened, the detachable first opening/closing means 11, 21, 31 and 41 of the long double doors 10, 20, 30 and 40, respectively, of the present invention are each configured to have a fastening mechanism that can endure heavy load. In the state where the door is closed, the fastening mechanism can exert high rigidity in the form of a structure in which the mechanism is integrated with the vehicle body. In the ninth embodiment and in the second modification of the ninth embodiment, high rigidity can be obtained by connecting the vehicle body with the door and forming the truss structure 443. In the four-seat cabriolets of the conventional door system, rigidity has been principally realized by reinforcing the floor structure of the vehicle bodies. The four-seat cabriolets installing the long double doors 10, 20, 30 and 40 of the present invention can promise high-rigidity and light-weight designs using the doors as parts of the vehicle body structure.

The invention claimed is:

1. A vehicle door system comprising:
a door (10, 40) provided on a side of a vehicle (1) having two rows of front and rear seats to cover by itself an area of the two rows of front and rear seats in the longitudinal direction of the vehicle;
two first linking means (11, 41) provided at a front end portion and a rear end portion of the door in the longitudinal direction of the door, and separately connecting the front end portion and the rear end portion of the door to the vehicle body in a releasable manner, while being controllable so as to open/close the door with respect to the vehicle body with a motion at least including one of rotation and parallel translation of the door with respect to the vehicle body; and
second linking means (42) having a first link (423) and a second link (424) which are connected with each other to enable control of rotation in a horizontal plane of the vehicle body, the first link having a vertical cross-sectional shape whose dimension in the height direction of the vehicle body is larger than a dimension in the horizontal direction of the vehicle body and having a lower end portion in the height direction connected to a floor portion of the vehicle body, which floor portion substantially faces a center portion of the door, and the second link having a vertical cross-sectional shape whose dimension in the height direction of the vehicle body is larger than a dimension in the horizontal direction of the vehicle body and having an upper end portion and a lower end portion in the height direction connected to an inner side face of the door, characterized in that:
when linkage of either one of the two first linking means with the vehicle body is released, the second linking means is expanded in the outward direction of the vehicle body to receive weight of the door and stress of the door in the height direction, cooperating with the remaining first linking means; and when the door is closed, the second linking means is folded and permitted to be positioned close to the inner side face of the door.

2. The vehicle door system according to claim 1, characterized in that the system comprises:
controlling means that controls the first linking means located at the front end portion of the door, when an occupant gets on the vehicle to take the seat in the front row or gets off the vehicle from the seat in the front row, to release linkage between the front end portion of the door and the vehicle body and to open/close the door, allowing the first linking means located at the rear end portion of the door to cooperate with the second linking means, and controls the first linking means located at the rear end portion of the door, when an occupant gets in the vehicle to take the seat in the rear row or gets out of the vehicle from the seat in the rear row, to release linkage between the rear end portion of the door and the vehicle body and to open/close the door, allowing the first linking means located at the front end portion of the door to cooperate with the second linking means.

3. The vehicle door system according to claim 1, characterized in that:
a lower end portion of the second linking means is provided to come close to the inner side face of the door when the door is closed, so that, when the door is closed, a substantially triangular truss structure (443) that receives the stress imposed on the door is configured by two upper end portions of the two first linking means, the upper end portions being connected to the vehicle body, and by the lower end portion of the second linking means, the lower end portion facing a center portion of the door and being connected to a floor portion of the vehicle body.

4. The vehicle door system according to claim 2, characterized in that:
a lower end portion of the second linking means is provided to come close to the inner side face of the door when the door is closed, so that, when the door is closed, a substantially triangular truss structure (443) that receives the stress imposed on the door is configured by two upper end portions of the two first linking means, the upper end portions being connected to the vehicle body, and by the lower end portion of the second linking means, the lower end portion facing a center portion of the door and being connected to a floor portion of the vehicle body.

* * * * *